US00RE35702E

United States Patent [19]

Cap et al.

[11] E Patent Number: Re. 35,702

[45] Reissued Date of Patent: Dec. 30, 1997

[54] COMPACT MOTOR MOUNT FOR INFORMATION STORAGE DEVICES

[75] Inventors: Heinrich Cap, St. Georgen; Alois Von Ehr, Imberg; Edgar Zuckschwert, St. Georgen, all of Germany

[73] Assignee: Papst Licensing, GmbH, Spaichingen, Germany

[21] Appl. No.: 552,135

[22] Filed: Nov. 2, 1995

Related U.S. Patent Documents

Reissue of:

[64] Patent No.: 5,028,829
Issued: Jul. 2, 1991
Appl. No.: 595,654
Filed: Oct. 9, 1990

U.S. Applications:

[63] Continuation of Ser. No. 87,372, Jul. 2, 1993, abandoned, which is a continuation of Ser. No. 384,039, Jul. 24, 1989, abandoned, which is a continuation of Ser. No. 125,782, Nov. 27, 1987, abandoned, which is a continuation of Ser. No. 884,537, Jul. 11, 1986, abandoned.

[30] Foreign Application Priority Data

Jul. 24, 1985 [CH] Switzerland ..... 3227/85

[51] Int. Cl.[6] ..... H02K 5/04; H02K 16/00; G11B 5/008

[52] U.S. Cl. ..... 310/114; 310/67 R; 310/268; 360/96.3

[58] Field of Search ..... 310/67 R, 68 R, 310/112, 114, 156, 267, DIG. 62, 68, 91; 360/90, 93, 96.1, 96.3, 96.4

[56] References Cited

U.S. PATENT DOCUMENTS

| | | | |
|---|---|---|---|
| 4,292,557 | 9/1981 | Kishi | 310/78 |
| 4,471,393 | 9/1984 | Ishigo et al. | 360/90 |
| 4,577,130 | 3/1986 | Reed | 310/194 |
| 4,578,606 | 3/1986 | Welterlin | 310/68 R |
| 4,626,727 | 12/1986 | Janson | 310/156 |
| 4,633,110 | 12/1986 | Genco et al. | 310/71 |
| 4,661,735 | 4/1987 | Miki et al. | 310/112 |
| 4,737,672 | 4/1988 | Kazami | 310/68 R |
| 4,851,731 | 7/1989 | Saotome et al. | 310/258 |
| 4,961,017 | 10/1990 | Kakinoki et al. | 310/71 |
| 4,982,130 | 1/1991 | Cap et al. | 310/268 |

FOREIGN PATENT DOCUMENTS

| | | |
|---|---|---|
| 55-128294 | 9/1980 | Japan . |
| 56-192387 | 7/1983 | Japan . |
| 57-167377 | 4/1984 | Japan . |

*Primary Examiner*—Clayton E. LaBalle
*Attorney, Agent, or Firm*—Welsh & Katz, Ltd.

[57] ABSTRACT

A compact motor mount for cassette drive systems includes a base plate in the form of a laminate that includes at least one planar layer of ferromagnetic material sandwiched between two printed circuit boards. A capstan motor is supported by the base plate. The stator coil assembly of the capstan motor is mounted on one side of the base plate directly on one of the two printed circuit boards. At least one winding drive motor also is supported in common with the capstan motor by the base plate. The stator coil assembly of the drive motor is mounted on the other side of the base plate directly on the second of the two printed circuit boards. Each of the motors has a permanent magnet rotor mounted on a shaft and facing the respective stator coil assemblies across an air gap defined therebetween.

47 Claims, 5 Drawing Sheets

COMPACT MOTOR MOUNT FOR INFORMATION STORAGE DEVICES

Matter enclosed in heavy brackets [ ] appears in the original patent but forms no part of this reissue specification; matter printed in italics indicates the additions made by reissue.

This application *is a file wrapper continuation application from prior U.S. patent application Ser. No. 08/087,372, which was filed Jul. 2, 1993, which is a reissue of Ser. No. 07/595,654 which* is a continuation of application Ser. No. 384,039, filed July 24, 1989, which is a continuation of Ser. No. 125,782, filed Nov. 27, 1987, which is a continuation of Ser. No. 884,537, filed July 11, 1986, all now abandoned.

The invention relates to a drive system for cassettes.

In such a drive system, there is a continuous tendency to improve and manufacture them in a more economical manner and construct them more compactly with substantially no losses in quality. In recent years, solutions have been offered that result in devices becoming increasingly flat, even extremely flat, and thus axially extraordinarily compact. Into such a system, a precision tacho system must be integrated insofar as possible, and the motor's electronics must be accommodated on a mounting plate as well. Also, braking devices for the spindle must be provided. Furthermore, the space in which signal processing takes place, and therefore where the heads are provided, must be magnetically shielded.

This task is the basis of the invention. It is solved by means of the measures indicated in the claims.

The following figures show the invention in which.

Figure 1:
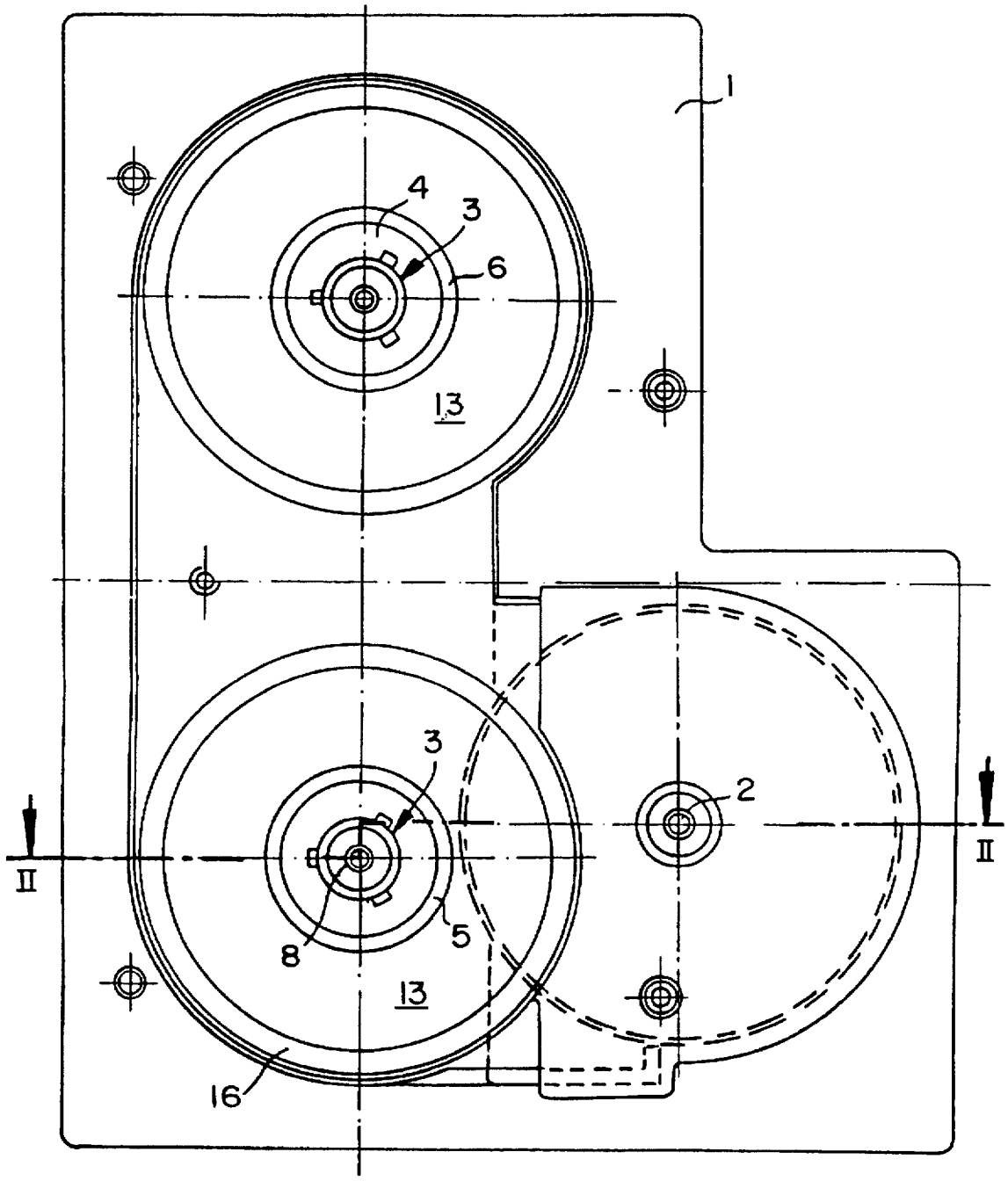
FIG. 1 is a top view of a drive according to the invention.

Considered individually, FIG. 1 shows a chassis housing or casing 1, a capstan shaft 2, and winding spindles 3, 4 with winding reels 5, 6. The winding spindles or reels, respectively, are provided with a rotating shaft 8, which is rotatable in a friction bearing 11 and additionally supported in the axial direction in a thrust bearing 12. Of course, this can be carried out in the opposite manner, so that a stationary shaft receives the rotating winding spindles and winding reels. The winding spindles and reels are envisioned in a standardized normal construction for a standard video tape cassette.

Figure 2:
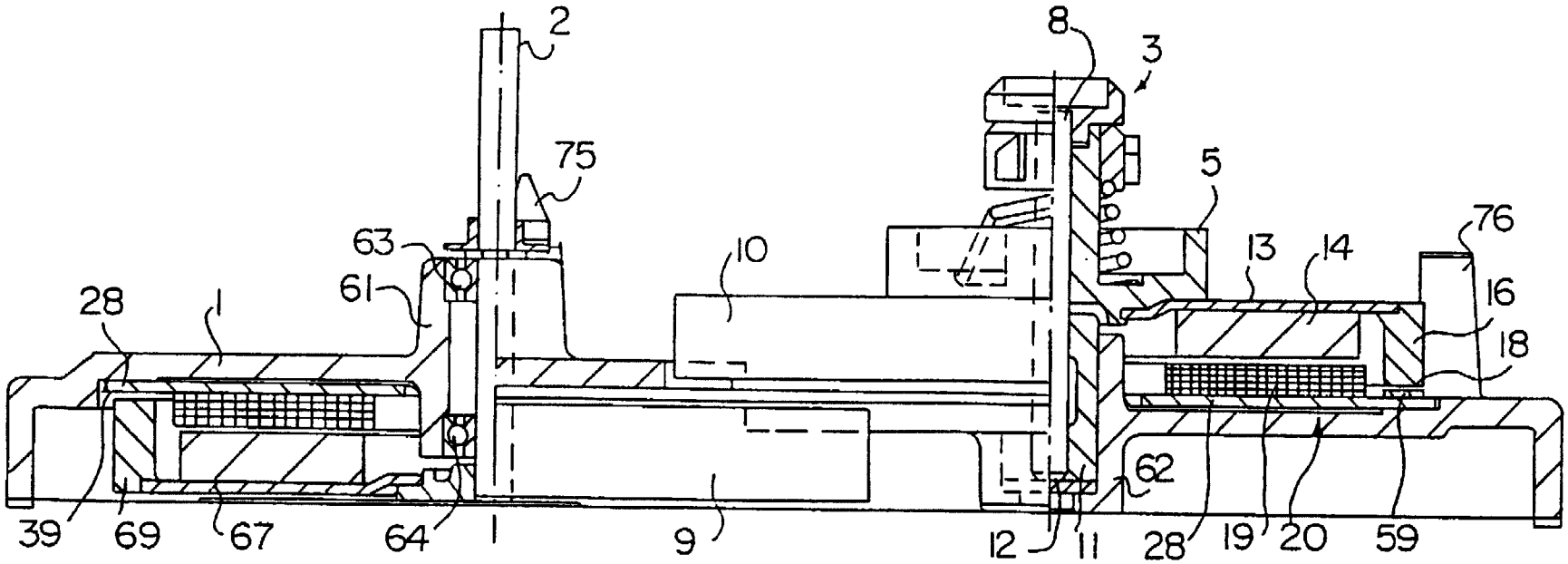
FIG. 2 is a section through the plate of FIG. 1 along the line II—II viewed in the direction of the arrows.

On the lower part of the winding reel 5, a soft magnetic return part 13 of the rotor is integrally formed or molded, or at least held in positive engagement, with an S-shaped cross-sectional profile. An axially magnetized permanent magnet 14 is attached to the substantially planar ring-shaped magnetic return part 13. The thickened rim 16 of the winding motor axially embraces in a bell-shaped form the permanent magnetic rotor and also the stator coils, thereby defining a small air gap 18. An air gap 19 of the winding motor is limited on the opposing side of the permanent magnet by a planar or flat coil set 20 including six separate coils 21 to 26. These are positioned on the upper side 29 of a board or plate assembly (lamination-like body) 28, and are in fact soldered there on printed circuits 31, 32, 33 shown in FIG. 3. The six coils are controlled in three-phase fashion and three Hall generators 41, 42, 43 are likewise soldered onto the printed circuit board, specifically in a printed circuit layer 30, which is applied directly to the surface 29 of the board 28. The six coils are equidistant and are of a trapezoidal shape. Four rotor poles oppose the six coils. The three-phase motor arrangement is useful in providing more power. If less power and less uniformity of torque can be tolerated, a four-coil arrangement can likewise be employed. This can mean, however, that not only is the uniformity of the torque reduced, but also, even with the same power requirement, the radial dimension of the stator coil arrangement is increased. The support or circuit board 28 has a soft magnetic core and is coated on both surfaces thereof. On the left side of FIG. 2 is seen the integral deck of the right half of the figure, and a printed circuit board is also provided on the under side 39 thereof, as can likewise be seen in FIG. 3. The motor, likewise constructed as a three-phase motor, has six equidistant stator coils having a trapezoidal shape. The Hall generators are positioned in three adjacent coils in their respective centers. As seen in the middle of FIG. 2, the ring of coils 51–56 (FIG. 3) on the under side of the capstan motor overlap the ring of winding motor coils 21–26 on the upper side of the board or plate 28. The Hall generators 44, 45, 46 are displaced by 120 electrical degrees so that a constant torque is obtained, particularly in the capstan motor.

Integrally cast in the housing chassis 1 is a bearing support tube 61 for the capstan drive, with shaft 2 being mounted for rotation in ball bearings 63, 64, and winding shaft 8 on the right being mounted for rotation in a sintered bearing 11 having two sliding (friction) surfaces, and this friction bearing component 11 is inserted as a sintered integral part into a bearing support tube 62. According to the concept as shown in FIG. 2, the rigidity of the device is provided primarily by the housing chassis 1. Nevertheless, it is important for the concept of the invention that the soft magnetic board or plate assembly 28 can be constructed as thickly as possible as a carrier body, so that its own rigidity is independently sufficient, and that these bearing support tubes or support elements can be employed in this layer. Because the parallelism of the axes 2 and 8 must be very precise, such a soft magnetic plate possibly may have additional reinforcing corrugations to increase its stability. FIG. 2 shows the advantage of the invention. Large motors can be radially constructed, and the stator coils, which form a radially large circle, need not be impeded by the predetermined fixed radial distances between the axes or shafts 2, 8, because the printed circuit board, having surfaces on both sides (the conductive layer printed on both sides), allows a radial overlapping of the winding groups and the rotors 9, 10. With respect to the stators 21–26 and 51–56 (individual coils), the board or plate assembly 28 serves as a non-rotating magnetic return path, whereas the rotating return path is provided by the disk 13 or 67, respectively, and in their axial positions, they define the maximum axial thickness of the drive assembly. Preferably, on the capstan, the motor is positioned below the board or plate, in which instance then the winding drive motors must be positioned above the plate 28. Thus, around the capstan shaft 2, the heads are sensitive to stray magnetic flux, but are shielded by the magnetic plate 28 from the stray flux emitted by the stator windings 51–56. Further illustrated on the right, near shaft 2, is a stopping pin 75, and, on the right end of FIG. 2, a corresponding pin 76 for retaining the cassette is provided.

As shown in FIG. 2, the bearing tube 61 of the capstan shaft 2 is extended in an upward direction so that the spacing between the two ball bearings 63, 64 becomes maximum. This is advantageous because the transverse load acting on the end of shaft 2 constitutes a considerable force during operation. The axial spacing apart of the bearings 63, 64 in other circumstances (assembly space and standardized dimensions) would be smaller if the motor including the rotor 9 were positioned above the plate 28. Furthermore, with the motor below the plate, the stray magnetic flux, as already described above, is thereby smaller (weaker) around the capstan shaft 2, where the heads are also positioned. A Hall generator 59 is positioned under the periphery of the part 16, a permanent magnet ring having 36 or 48 poles that are axially magnetized and the magnetic field or flux of which acts on the Hall generator 59. The ring 69, which, in a shell-like manner and together with the plate 67, constitutes the rotating casing of the capstan motor, can be constructed as such a permanent magnet and act on another but correspondingly positioned Hall generator as number 59. Counting or rotation signals for controlling or detecting the tape coils or the revolutions can be obtained from the pulses of such Hall generator of the capstan motor.

Figure 3:
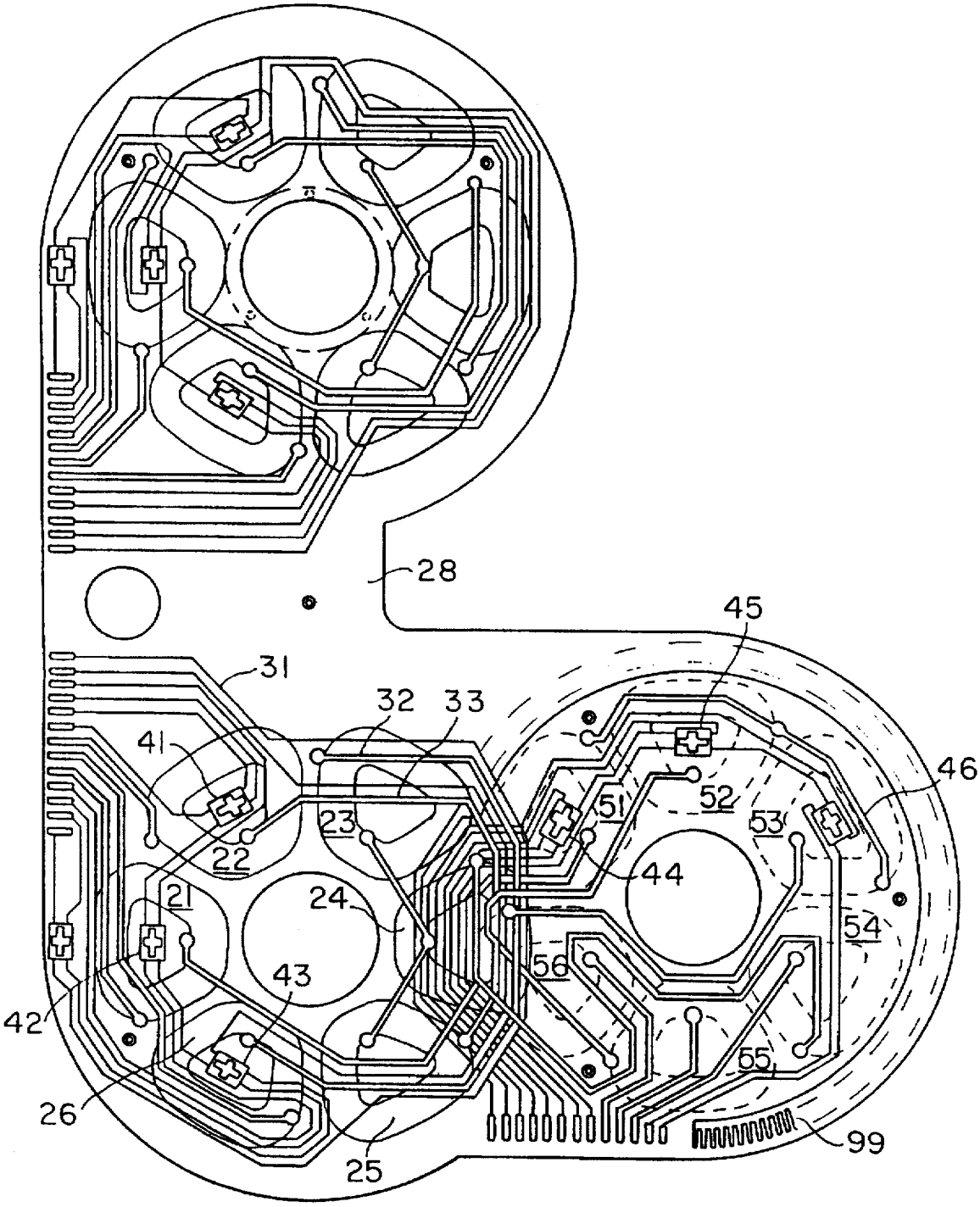
FIG. 3 is a plan view of the mounting plate assembly developed in accordance with the invention, in which the drive coils for the winding motors are located on the upper side and the drive coils for the capstan motor are on the under side.
Figure 6:
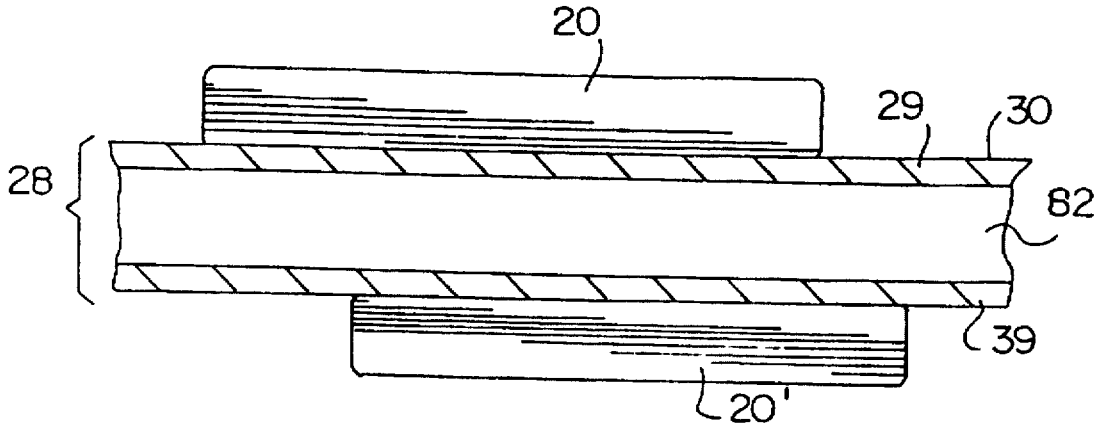
FIGS. 6 and 7 show variations of the support plate assembly, each in a partially cut-away representation.
Figure 7:
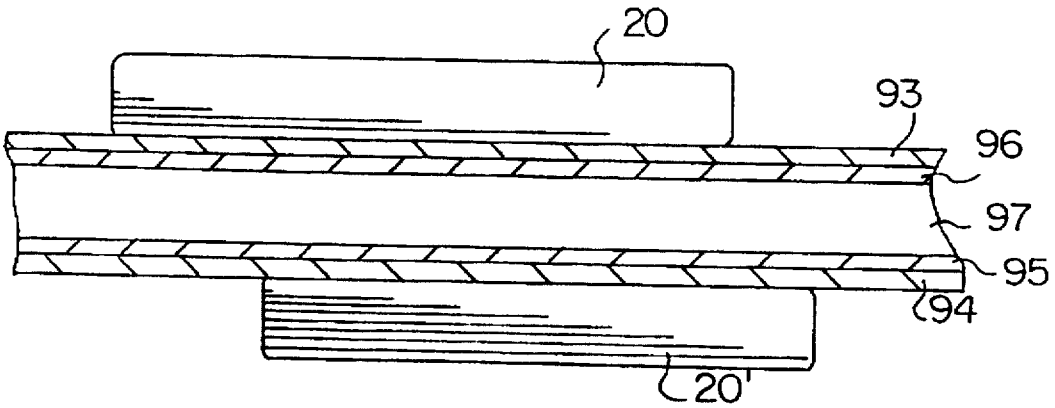

Independently of this, as FIG. 3 shows, a meander or tacho winding 99 is provided on one part of the circumference of the plate on which magnetic ring 69 acts. This meander winding 99 is provided on the printed circuit board. A magnetic return path for intercepting stray magnetic flux is provided by the plate 28 (FIGS. 6 and 7.)

In the present embodiment, the overlapping of the coil assemblies can be seen in FIG. 3. Instead of six coils, which are connected in three-phase relationship, four coils can also be provided, wherein only two phases are required, and only two Hall generators need be provided to be acted upon by the permanent magnetic rotor. However, two-phase motors have somewhat smaller torques and somewhat smaller load capacities. For larger load requirements, one might then need to enlarge the diameter of the motor to such a scale that the two coil assemblies on the bottom half of FIG. 3 are each constructed with only four coils, namely as described in the German Offenlegungsschrift 24 24 290, and this would then mean an arrangement such as that of the coils 22, 23, and 25, 26 or somewhat circumferentially displaced therefrom such as coils 51, 52 and 54, 55.

If the device is provided in accordance with D-OS 25 33 187, it would correspond to a coil configuration approximately having the position of the coils 21, 22, 25, 26, angularly displaced on the other side of the coils 52–55, thereby allowing for a maximum distance between the stators. A radial overlapping is then avoidable, and this would mean that all stator coils could be located on the same side of the plate, but only if the advantageous coil configuration in accordance with German Offenlegungsschrift 25 33 187 or 24 24 290 is used. This is not to say, however, that such construction would be sufficient. With radially larger stator assembly diameters, the correspondingly larger rotor diameter will allow use of less weight of material in the rotor for the same moment of inertia.

Figure 4:
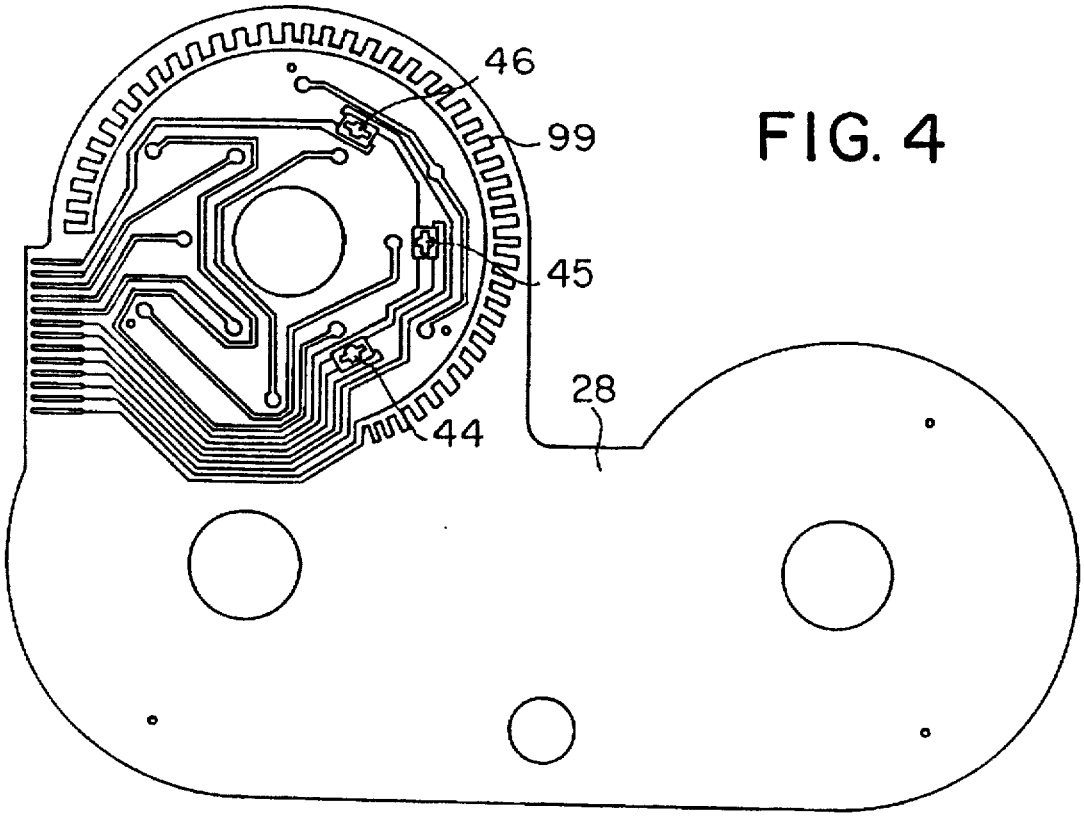
FIGS. 4 and 5 are each a pictorial illustration of the plate assembly in accordance with FIG. 3, under and upper sides, respectively, of a video-cassette drive assembly.
Figure 5:
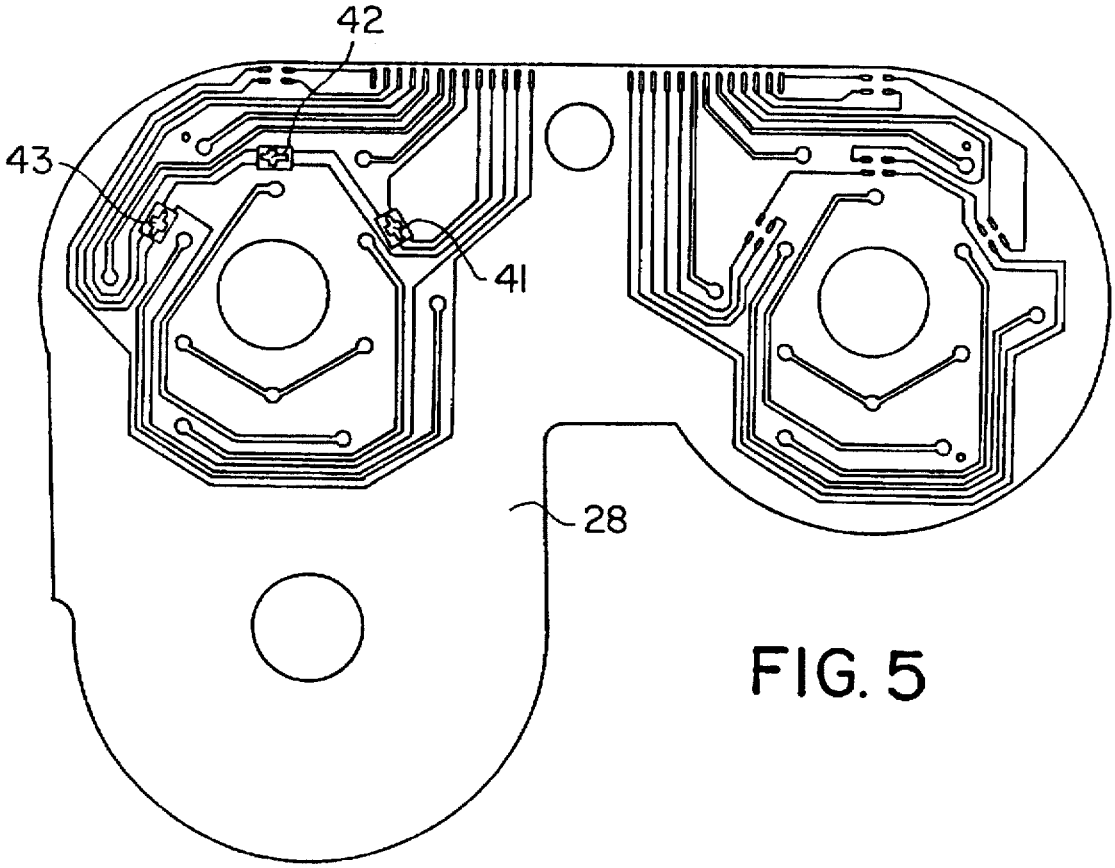

A variation of the embodiment of FIG. 2 is in making the plate 28 thick enough that each bearing support tube, for example made with a small flange around the tube's central portion which can mount on the plate, is fastened by screws to the plate rather than being integral with the chassis to support the bearings. The bearing tubes are individually constructed as shown in FIG. 2. Then as shown in FIG. 3 in the upper opening, three attachment holes are provided into which such a flange part of a bearing support tube can be screwed in. A presupposition for this is, of course, that the plate 28 is at least 1 mm thick. FIGS. 4 and 5 show photomechanical representations of both sides of plate 28, and FIG. 6 shows an enlargement of the section through the plate 28 of FIG. 2. It can be seen that the upper and the lower covering layer 29, 39, each of which is to be understood as a printed circuit board, has the conductors to which the coils 20 are soldered, and to which all the electronics are to be likewise attached. The core which essentially makes up the thickness is soft magnetic material, and thus preferably made of a ferromagnetic material such as soft iron, which serves for the magnetic return paths of the magnetic circuits of the motor parts, or, if that is not necessary, simply for shielding. If no shielding is needed, this layer can be thinner. The soft iron core 82 of the plate 28 is coated on both sides with the printed circuit boards 29, 39.

FIG. 7 likewise shows in enlarged form another variant of a planar mounting board or plate in accordance with the invention, wherein in place of a magnetic core, a solid layer 97 is provided that determines most of the thickness of the body, and a soft magnetic layer 96 (perhaps likewise formed as a highly permeable material) serves for shielding. If an improvement of the shielding is additionally required, a second layer 95 of this type can be provided on the other side. In any event, the conductor layers 93 and 94 are constructed similarly to that described in connection with FIG. 6, but wherein the coils, only schematically depicted, are further separated from the mounting core. The conductor layer as depicted, however, is not a filled out solid layer in the actual embodiment. If a magnetic return path is also needed for one or the other coil, the corresponding layer, for example, 95 or 96, is thickened, and it can be determined for each individual situation whether it is sufficient also as a shield, or whether a layer is also necessary for shielding on the other side.

The invention allows, through the two-sided lining with conductor paths on an essentially soft magnetic layer, which is provided either self-supporting or with a solidifying layer for stability, possibilities for greater miniaturization and compactness of the devices. The application of the opposing conductor plates can occur in connection with hot or cold adhesive or directly in the manufacturing process of the printed circuit boards.

The soft magnetic conductor plate does not require any highly alloyed iron quality. The flat motors with planar air gaps can be replaced by motors having cylindrical air gaps and large D/L ratios (D=air gap diameter; L=axial length).

The direct drive (DD) capstan motor is electronically commutated and the two DD-winding motors are electronically commutated. Common mounting plates are formed on both sides by lamination techniques and contain as much of the electronics as possible. The plate is mounted on an aluminum or plastic chassis, which also supports all the motors.

This system is also conceivable with all brush motors, or with two brush motors as DD-winding motors and one brushless capstan motor. Such an alternative solution is less expensive because of the elimination of commutation electronics and is dynamically advantageous through less mass of the winding motors.

We claim:

1. A drive system for cassettes comprising:

a base plate in the form of a laminate that includes at least one planar layer of ferromagnetic material sandwiched between two printed circuit boards;

a capstan motor supported by the base plate, the motor including a stator coil assembly mounted directly on the outer planar surface of a first of the two printed circuit boards, a shaft supported by the base plate and mounted so as to extend generally at right angles to the base plate, and a permanent magnet rotor mounted on the shaft and facing the stator coil assembly across an air gap defined therebetween; and at least one winding drive motor supported in common with the capstan motor by the base plate, the motor including a stator coil assembly mounted directly on the outer planer surface of the second of the two printed circuit boards, a shaft supported by the base plate and mounted so as to extend generally at right angles to the base plate at a preset distance from and parallel to the shaft of the capstan motor, and permanent magnet rotor mounted on the shaft and facing the drive stator coil assembly across an air gap defined therebetween.

2. A drive system in accordance with claim 1, wherein the base plate is mounted on a separate chassis housing which supplies rigidity to the total assembly.

3. A drive system in accordance with claim 1, wherein the layer of ferromagnetic material is sufficiently thick to provide rigidity to the base plate and drive system.

4. A drive system in accordance with claim 1, wherein the laminate includes two layers of ferromagnetic material on either side of a planar core of solid material, all sandwiched between the two printed circuit boards.

5. A drive system in accordance with one of claims 1 to 4, wherein the ferromagnetic material is soft iron.

6. A drive system in accordance with one of claims 1 to 4, wherein the capstan and the at least one winding drive motors are flat air gap motors.

7. A drive system in accordance with one of claims 1 to 4, wherein the capstan and the at least one winding drive motors are three phase motors.

8. A drive system in accordance with claim 6, wherein the motors are three phase and the stators include six equidistantly spaced coils forming a planar circle around the shaft as center.

9. A drive system in accordance with one of claims 1 to 4, wherein the rotors of the capstan and the at least one drive motors each have a diameter which in relation to the preset distance between shafts cause the rotors to radially overlap one another in their axially spaced apart relation.

10. A drive system in accordance with one of claims 1 to 4, wherein each of the printed circuit boards includes electrical circuit connections of the stator coils and in addition active circuit elements for the operation of the respective motors.

11. A drive system in accordance with one of claims 1 to 4, wherein the motors are external rotor motors.

12. A drive system in accordance with one of claims 1 to 4, wherein the motors are brushless dc motors.

13. A drive system in accordance with one of claims 1 to 4, wherein at least one of the printed circuit boards includes a meander winding located to be magnetically acted upon by the associated permanent magnet rotor.

14. A drive system in accordance with claim 2, wherein bearing support tubes are formed integrally with the chassis housing, the bearing support tubes containing bearing means rotatingly mounting the respective shafts, including the capstan shaft.

15. A drive system in accordance with claim 3, wherein clearance holes are provided in the base plate laminate for the shafts and associated bearing support tubes to extend therethrough and a plurality of screw holes are provided in the base plate around the clearance holes to receive screws for mounting the bearing support tubes.

16. A drive system in accordance with one of claims 1 to 4, wherein in respect of the capstan motor, the end of the shaft around which are the capstan heads is on the opposite side of the base plate from the corresponding stator and rotor, the heads thereby being magnetically shielded by the ferromagnetic material of the base plate laminate.

*17. A drive for an information storage device having a moveable storage medium and a head associated therewith to permit information to be stored on and retrieved from the storage medium, said drive comprising:*

*a base plate including a planar layer of ferromagnetic material having a printed circuit board affixed to one side thereof; and*

*a motor supported by said base plate, said motor including a stator coil assembly mounted on the outer surface of said printed circuit board and a shaft rotatably mounted on said base plate, said shaft having a first end portion extending from said printed circuit board generally at a right angle thereto adjacent the stator coil assembly and a second end portion extending from said ferromagnetic layer generally at a right angle thereto for operative engagement with the information storage device to allow the head to store information on and retrieve information from the storage medium, said motor further including a permanent magnet rotor attached to the first end portion of said shaft, said rotor providing a stray flux return path from said stator coil assembly to said base plate via a first air gap between said stator coil assembly and said rotor and a second air gap between said rotor and said base plate to provide at least some shielding of the storage medium from stray electromagnetic interference emitted from the stator coil assembly.*

*18. A drive in accordance with claim 17, wherein the base plate is mounted on a separate chassis housing which supplies rigidity to the total assembly.*

*19. A drive in accordance with claim 17, wherein the layer of ferromagnetic material is sufficiently thick to provide rigidity to the base plate and drive.*

*20. A drive in accordance with claim 17 wherein the base plate comprises a laminate of two layers of ferromagnetic material on either side of a planar core of solid material wherein said printed circuit board is affixed to one of the two layers of ferromagnetic material.*

*21. A drive in accordance with claim 17 wherein the ferromagnetic material is soft iron.*

*22. A drive in accordance with claim 17 wherein the motor is a flat air gap motor.*

*23. A drive in accordance with claim 17 wherein the motor is a three phase motor.*

*24. A drive in accordance with claim 22, wherein the stators include six equidistantly spaced coils forming a planar circle around the shaft as center.*

*25. A drive in accordance with claim 17 wherein said printed circuit board includes electrical circuit connections of the stator coils and active circuit elements for the operation of the motor.*

*26. A drive in accordance with claim 17 wherein the motor is an external rotor motor.*

*27. A drive in accordance with claim 17 wherein the motor is a brushless dc motor.*

*28. A drive in accordance with claim 18 wherein said printed circuit board includes a meander winding located to be magnetically acted upon by the associated permanent magnet rotor.*

*29. A drive in accordance with claim 20, wherein a bearing support tube is formed integrally with the chassis*

*housing, said tube including means for rotatably mounting said shaft thereto.*

*30. A drive in accordance with claim 20 wherein a clearance hole is provided in the base plate for the shaft and associated bearing support tube to extend therethrough and a plurality of screw holes are provided in the base plate around the clearance holes to receive strews for mounting the bearing support tube.*

*31. A drive in accordance with claim 17 wherein said rotor is cup-shaped.*

*32. A drive in accordance with claim 17 wherein said rotor is cylindrical and has a diameter greater than that of the stator coil assembly, said rotor having a rim extending towards said printed circuit board to form said second air gap.*

*33. A drive for an information storage device having a moveable storage medium and a head associated therewith to permit information to be stored on and retrieved from the storage medium, said drive comprising:*

*a base plate including a planar layer of ferromagnetic material having a printed circuit board affixed to one side thereof; and*

*a motor supported by said base plate, said motor including a stator coil assembly mounted on the outer surface of said printed circuit board and a shaft rotatably mounted on said base plate, said shaft having a first end portion extending from said printed circuit board generally at a right angle thereto adjacent the stator coil assembly and a second end portion extending from said ferromagnetic layer generally at a right angle thereto for operative engagement with the information storage device to allow the head to store information on and retrieve information from the storage medium, said motor further including a cup-shaped permanent magnet rotor attached to the first end portion of said shaft, said rotor having a rim disposed at its outer periphery which extends towards said base plate to substantially enclose said stator coil assembly within the space defined by said rotor and said base plate and provide at least some shielding of the storage medium from stray electromagnetic interference emitted from the stator coil assembly.*

*34. A drive in accordance with claim 33, wherein the base plate is mounted on a separate chassis housing which supplies rigidity to the total assembly.*

*35. A drive in accordance with claim 33, wherein the layer of ferromagnetic material is sufficiently thick to provide rigidity to the base plate and drive.*

*36. A drive in accordance with claim 33, wherein the base plate comprises a laminate of two layers of ferromagnetic material on either side of a planar core of solid material wherein said printed circuit board is affixed to one of the two layers of ferromagnetic material.*

*37. A drive in accordance with claim 33, wherein the ferromagnetic material is soft iron.*

*38. A drive in accordance with claim 33, wherein the motor is a flat air gap motor.*

*39. A drive in accordance with claim 33, wherein the motor is a three phase motor.*

*40. A drive in accordance with claim 37, wherein the stators include six equidistantly spaced coils forming a planar circle around the shaft as center.*

*41. A drive in accordance with claim 33, wherein said printed circuit board includes electrical circuit connections of the stator coils and active circuit elements for the operation of the motor.*

*42. A drive in accordance with claim 33, wherein the motor is an external rotor motor.*

*43. A drive in accordance with claim 33, wherein the motor is a brushless dc motor.*

*44. A drive in accordance with claim 33, wherein said printed circuit board includes a meander winding located to be magnetically acted upon by the associated permanent magnet rotor.*

*45. A drive in accordance with claim 34, wherein a bearing support tube is formed integrally with the chassis housing, said tube including means for rotatably mounting said shaft thereto.*

*46. A drive in accordance with claim 35, wherein a clearance hole is provided in the base plate for the shaft and associated bearing support tube to extend therethrough and a plurality of screw holes are provided in the base plate around the clearance holes to receive screws for mounting the bearing support tube.*

*47. A drive in accordance with claim 33, wherein said rotor is cylindrical and has a diameter greater than that of the stator coil assembly, said rotor having a rim extending towards said printed circuit board to form said second air gap.*

* * * * *